Jan. 26, 1943.  W. D. BELL  2,309,568
APPARATUS FOR SEALING CONTAINERS
Filed April 22, 1940  6 Sheets-Sheet 1
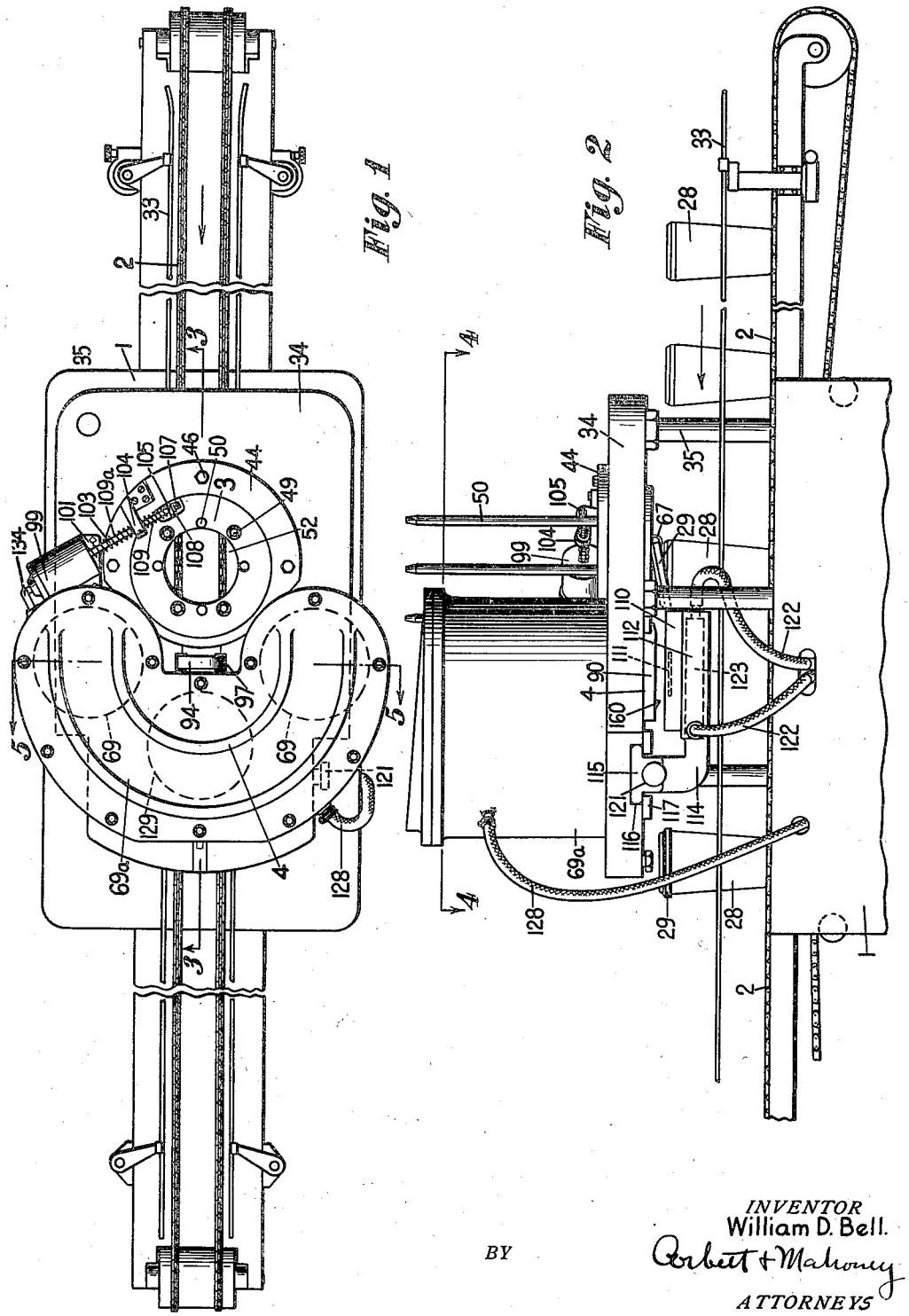
INVENTOR
William D. Bell.
BY Corbett + Mahoney
ATTORNEYS

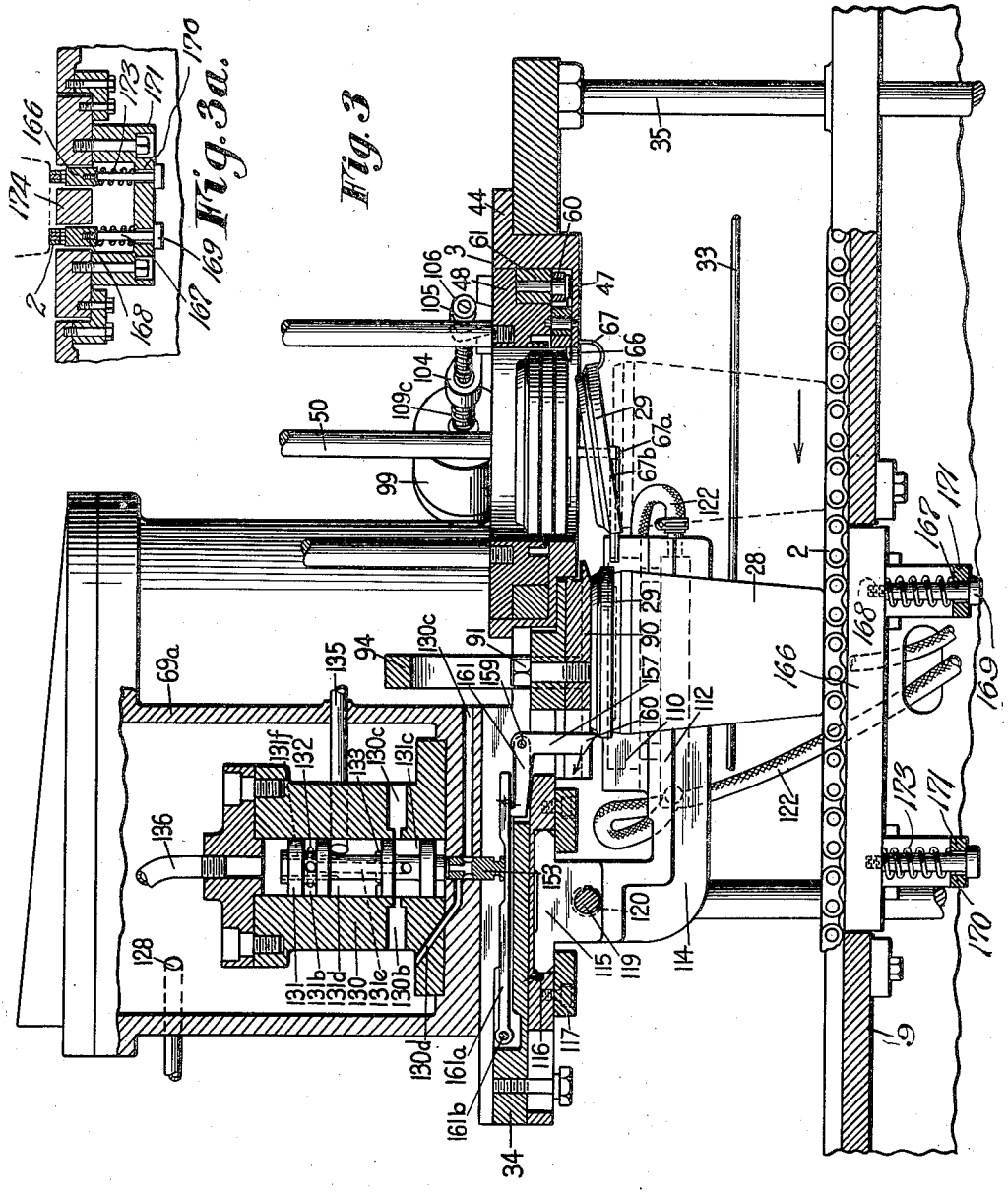

Jan. 26, 1943.                W. D. BELL                    2,309,568
                    APPARATUS FOR SEALING CONTAINERS
            Filed April 22, 1940           6 Sheets-Sheet 3

INVENTOR
William D. Bell.
BY Corbett & Mahoney
ATTORNEYS

Jan. 26, 1943.  W. D. BELL  2,309,568
APPARATUS FOR SEALING CONTAINERS
Filed April 22, 1940    6 Sheets—Sheet 6

INVENTOR
William D. Bell.
BY
Corbett + Mahoney
ATTORNEYS

Patented Jan. 26, 1943

2,309,568

UNITED STATES PATENT OFFICE 2,309,568

APPARATUS FOR SEALING CONTAINERS

William D. Bell, Columbus, Ohio, assignor to Anchor-Hocking Glass Corporation, Lancaster, Ohio, a corporation of Delaware Application April 22, 1940, Serial No. 330,865

18 Claims. (Cl. 226—82)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

One of the objects of my invention is to provide a greatly simplified apparatus for applying and sealing closures on containers and for creating an effective vacuum in the space at the upper end of the container between the closure and the contents of the container which will aid in preventing spoilage of the contents and will also aid in keeping the closure in position on the container.

Another object of my invention is to provide apparatus of the type indicated which is of such a nature that the closure and the upper end of the container and the head space between the contents and the closure will be sterilized during the sealing operation.

Another object of my invention is to provide an apparatus of the type indicated which will vacuumize and seal the container quickly and effectively.

Another object of my invention is to provide a machine of the type indicated which is of a very simple structure and therefore can be built at a relatively low cost, which will occupy a small amount of space, and which is composed of a minimum number of parts tending to wear or become inoperative.

Another object of my invention is to provide a machine of the type indicated which may be adjusted readily to operate upon containers of various sizes.

Another object of my invention is to provide a machine which will be continuous in operation and which will perform its operation without handling of the containers by an operator.

Another object of my invention is to provide a machine of the type indicated wherein the sterilizing and vacuumizing is accomplished with steam and wherein the sealing means is also operated by steam which makes it possible to provide a very simple and compact machine.

Another object of my invention is to provide a machine of the type indicated in the preceding paragraph which has means associated therewith for substantially preventing condensation of the steam used in operating the sealing means so that it will, therefore, be more effective.

Another object of my invention is to provide a machine of the type indicated which has a cap feeding and applying means associated therewith for loosely positioning the caps on the containers and which is actuated in a novel and efficient manner each time the container sealing means is actuated.

In its preferred form, my invention contemplates the provision of a simple apparatus for applying closures to and sealing them on various containers such as jars, bottles, cans, etc. The apparatus comprises a continuously moving conveyer upon which the filled containers are placed indiscriminately. Means is provided in association with the conveyer for centering and maintaining the containers centered on the conveyer. The containers are first moved by the conveyer to a cap feeding and applying unit where caps or other closures are loosely positioned on the upper ends of the containers. The containers are then moved to a point where a sealing head is disposed. The sealing head and the cap feeding and applying unit are preferably disposed directly adjacent each other. The sealing head is spaced slightly above the upper ends of the containers. Associated with the sealing head is means for forcing it downwardly whenever a container, having a cap properly associated therewith, moves beneath the sealing head. This will force the cap downwardly into frictional engagement with the upper end of the container. The cap feeding and applying unit is controlled and actuated by the sealing head operating mechanism so that each time the sealing head is actuated, a cap is fed from the cap feeding unit into position to be engaged by the next container. The sealing head has means associated therewith for automatically lifting the cap from the upper end of each container and for injecting steam into the head space at the upper end of each container to displace the air therefrom, both of these operations being performed substantially simultaneously just prior to the sealing of the cap on the container. After the cap is sealed on the container, the steam previously injected into the head space of the container will condense, creating an effective vacuum within the container which will aid in holding the cap in position and will also aid in preventing spoilage of the contents of the container. Since I provide steam for sterilizing and vacuumizing, I have found that it is also very desirable to use steam as the force for moving the sealing head downwardly. For this purpose, I preferably employ steam cylinders which are enclosed in a steam jacket to substantially prevent condensation of the steam for operating the cylinders and, therefore, make them more effective. During the sealing operation, the container is stationary and the conveyer continues to move therebeneath. However, as soon as the pressure produced by the sealing head is eliminated, the container will again be moved by the conveyer away from the sealing head.

Various other objects and advantages will be apparent from the following description.

It will be understood that if the contents of the container is porus, air will not only be removed from the head space above the contents but also from the contents.

This application is a continuation in part of my co-pending application, Serial No. 314,299, filed January 17, 1940.

The preferred embodiment of my invention is illustrated in the accompanying drawings whereing similar characters of reference designate corresponding parts and wherein:

Figure 1 is a plan view of a machine made according to my invention.

Figure 2 is a side elevational view of the machine shown in Figure 1.

Figure 3 is a vertical sectional view taken substantially along line 3—3 of Figure 1, illustrating the sealing head unit and the cap feeding and applying unit of my machine.

Figure 3a is a transverse sectional view through the conveyer illustrating the mechanism for permitting interruption of the movement of the container with the conveyer during sealing.

Figure 4:
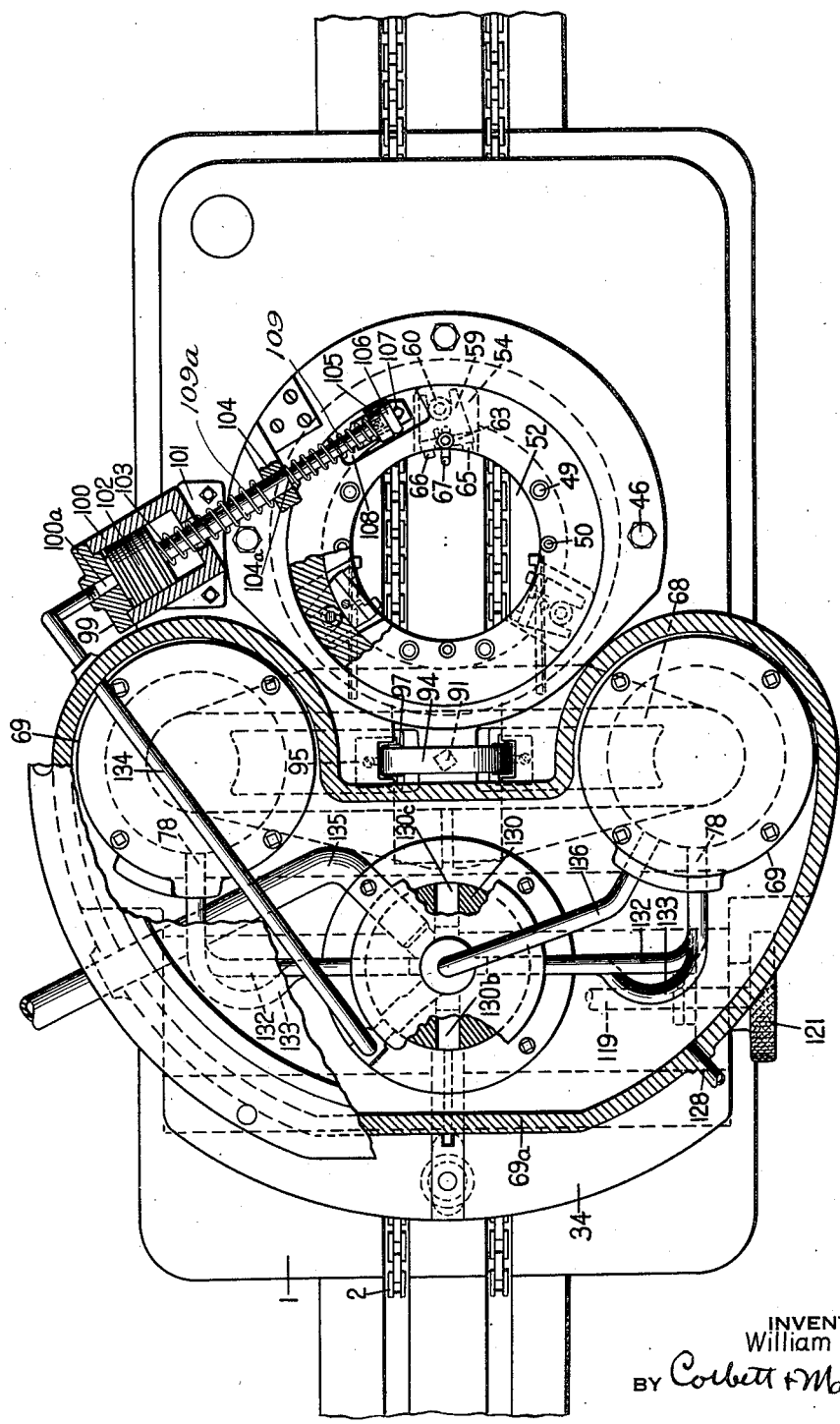
Figure 4 is a view mainly in plan but partly in horizontal section of the structure shown in Figure 3.

With reference to the drawings, I have illustrated a machine which comprises generally a table 1 supporting a horizontal conveyer unit 2 on its upper end, a cap feeding and applying unit 3, and a sealing head unit 4.

The table 1 and the conveyer unit 2 may be identical with the corresponding structures disclosed in my co-pending application S. N. 314,299, filed January 17, 1940.

The containers 28 are placed indiscriminately on the conveyer and are moved in the direction of the arrows (Figures 1, 2 and 3) by the conveyer. My invention is not limited to any particular type of container and cooperating cap but for illustrative purposes I have shown in Figure 5 a tumbler 28 adapted to receive the cap 29 on its upper end. This cap preferably embodies a substantially disk-like portion 30 which has a depending annular skirt 31 which carries an annular gasket 32 therewithin. When the cap is forced downwardly onto the upper end of the container, the frictional contact of the gasket with the upper end of the container will aid in maintaining the cap in position and will seal the cap on the container.

Figure 5:
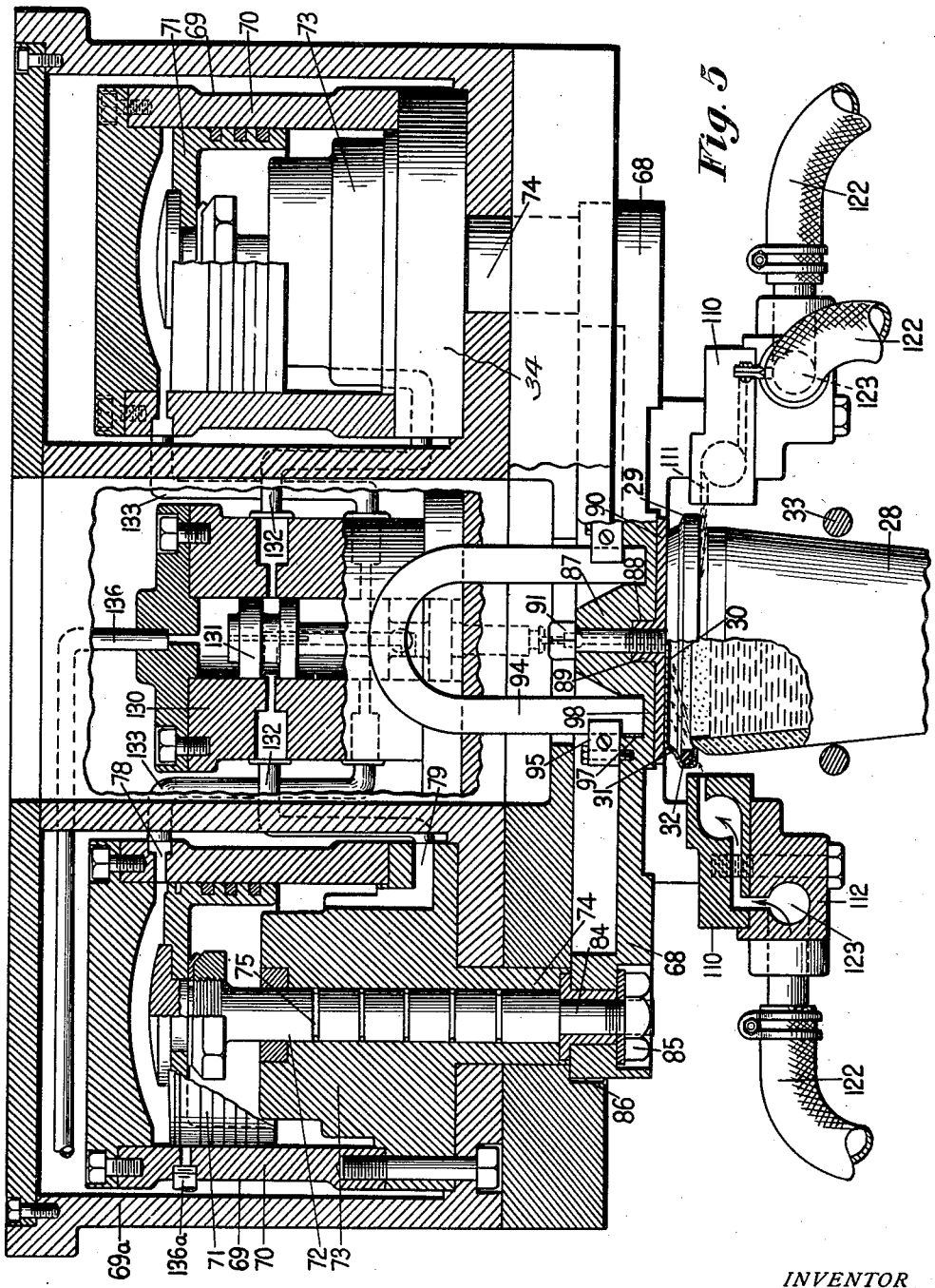
Figure 5 is a transverse vertical sectional view taken substantially along line 5—5 of Figure 1.

In order to center the containers transversely of the conveyer and to maintain them centered, I provide a pair of longitudinally extending guide rails 33 (Figures 1, 2 and 5). These guide rails are supported on opposite sides of the conveyer in such a manner that they may be adjusted towards and away from each other. They are supported and adjusted in the manner disclosed in the patent to Harold H. Snyder et al., No. 2,229,605, issued January 21, 1941, for Guide rails for conveyers. Thus, these guide rails will center the containers on the conveyer, as they are moved between the rails, and will maintain them centered on the conveyer during the various operations performed by the machine.

After the containers are positioned on the conveyer, they are first carried to the cap feeding and applying unit 3. This unit is of such a type that it will apply a cap loosely to the upper end of the container. After the container passes the unit 3, it passes to the sealing head unit 4. This sealing head unit 4 is adapted to displace the air from the head space and to sterilize such space and the cap before the sealing operation.

The units 3 and 4 are disposed directly adjacent each other. They are both supported by a horizontally disposed plate 34 (Figures 1 and 2). The plate 34 is supported at a point spaced above the table 1 by means of a plurality of vertically disposed posts 35. These posts may be in any suitable number and extend downwardly through the top of the table. They are free to move vertically in the openings in the top of the table through which they pass. They may be adjusted vertically in the manner disclosed in my said co-pending application S. N. 314,299. Thus, the plate 34 may be adjusted vertically to position the units 3 and 4 at the proper height above the conveyer, depending upon the height of the containers to be sealed.

The cap feeding and applying unit 3 is illustrated best in Figures 1, 3, 4, 8, 9 and 10. This unit comprises an annular member 44 which fits in an opening formed in the plate 34. This member is provided with a peripheral flange 45 (Figures 3 and 9) which rests on the top of plate 34 and which may be bolted thereto by means of bolts 46 (Figure 1). On its lower edge, the member 44 is provided with an inwardly projecting shelf-like portion 47. The member 44 receives an annular collar 48 (Figures 3 and 9) which may be slipped thereinto and which will rest on the portion 47 thereof. This member is held in position by means of screws 49 (Figure 1). The member 48 carries four upstanding posts 50. Each of these posts is provided with a reduced lower end 51 which removably fits in an opening formed in the member 48. These posts 50 are disposed adjacent the central opening 52 (Figure 1) formed within the collar 48. This opening is of such a size as to permit the caps to drop therethrough. A stack of nested caps is adapted to be disposed within the posts 50.

Figure 8:
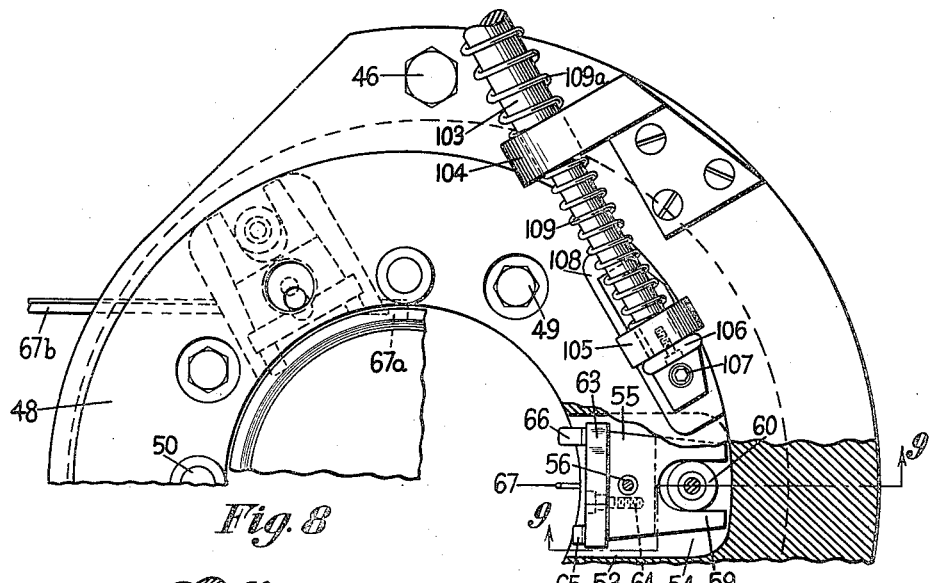
Figure 8 is a detail in plan, partly broken away, of a portion of the cap feeding unit.
Figure 9:
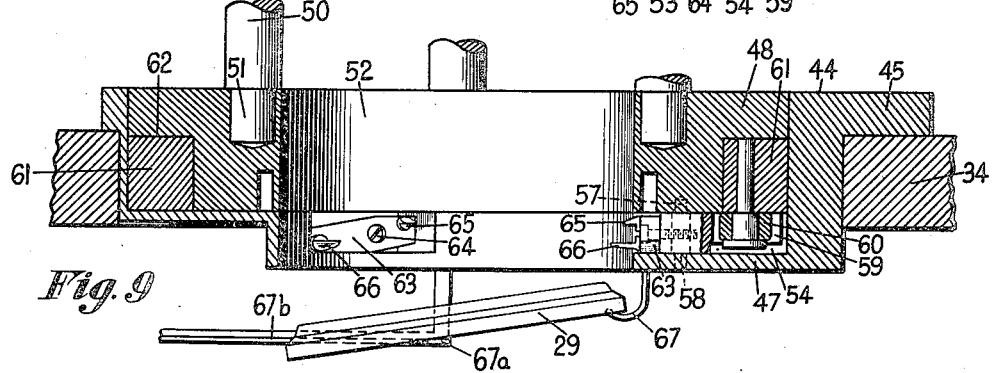
Figure 9 is a transverse vertical sectional view taken substantially along line 9—9 of Figure 8.

For controlling the movement of the caps through the opening 52, formed within member 48, I provide the following structure. At suitable circumferentially spaced intervals, the collar 48 is provided with apertures or notches 53 (Figure 8) which extend inwardly entirely through the collar. The inner end of each aperture communicates with a chamber 54 formed in the annular member 44 in alignment therewith. In each chamber formed by an aperture 53 and a cooperating chamber 54, an escapement member 55 is disposed. Each of these members is pivotally mounted, as indicated in Figures 8, 9 and 10. The pivot pin 56 is carried by the member 55 intermediate the inner and outer ends thereof. The upper end of the pivot pin 56 is rotatably carried by the member 48, as at 57, while the lower end of the pivot pin is rotatably carried by the portion 47 of the member 44, as at 58.

The inner end of each member 55 is provided with a bifurcated portion 59. Each of these portions 59 has a roller 60 disposed therebetween. These rollers 60 are carried at properly circumferentially spaced intervals by a ring 61. The ring 61 is disposed in an annular space 62 formed within the collar 48 at the lower and inner edge thereof. The ring 61 is free to rotate slightly or oscillate relative to the member 48. When the ring is rotated, all of the members 55 are swung about their pivot points 56. Each of the members 55 has a flat outer end and a member 63 is disposed in abutting relationship to this flat outer end. This member 63 is pivoted to the member 55 by a pivot pin 64. Each member 63 is provided with an outwardly projecting upper knife-like finger 65 and a lower outwardly projecting knife-like finger 66.

Figure 10:
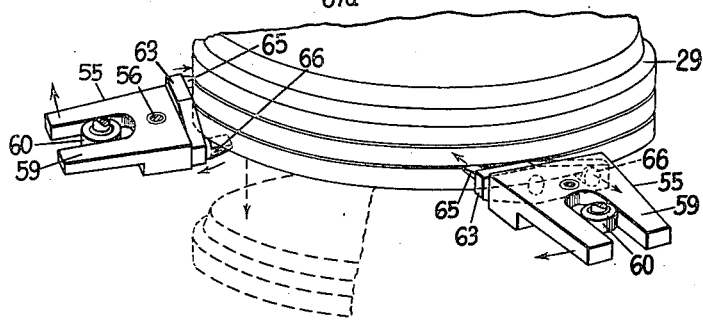
Figure 10 is a perspective view illustrating the members which control the feed of the caps.

Normally the members 55 will be in such a position that the lower fingers 66 will project outwardly beyond the wall of the opening 52, as indicated in Figures 8 and 9. Consequently, the lowermost cap of the stack will rest on these fingers 66 and will be prevented from dropping through the opening 52, as indicated in Figures 3 and 10. At this time the fingers 65 will not project into the opening 52. However, when the ring 61 is rotated in the proper direction, it causes the members 55 to pivot in such a manner that the fingers 66 will be withdrawn inwardly into the opening 52 and the fingers 65 will be swung outwardly into the opening. This will permit the lowermost cap to drop while the cap next above will be engaged by the fingers 65 and will be prevented from dropping. As soon as the ring 61 is returned to its original position, the fingers 65 will again be withdrawn from the opening 52, allowing the stack of caps to drop onto the fingers 66, which will again be projected into the opening 52. Thus, rotation of the ring 61 will permit one of the caps to drop from the opening 52. Each member 63 is free to move slightly about its pivot 64 to prevent jamming of the feeding device. The movement is limited, as indicated in Figure 9, by the member 48 disposed thereabove and the portion 47 of member 44 disposed therebelow. Thus, it will be apparent that the caps will be fed one by one from the opening 52. The cap released from the stack will drop downwardly and will be received by a hook 67 (Figure 3), depending from the portion 47 of member 44 and disposed adjacent and behind the opening 52, and a pair of fingers 67a which are formed on guide members 67b. These members 67 and 67a will support the cap in a downwardly inclined position, as indicated in Figure 3, so that as a container is moved beneath the cap by the conveyer, the upper edge of the container will engage the forward portion of the skirt of the cap and will pull it off the members 67 and 67a, allowing it to drop into position on the flanges of members 67b.

The members 67b are disposed in parallel relationship and extend longitudinally of the path of movement of the containers. They are spaced apart, as indicated best in Figure 4, a distance slightly less than the diameter of the cap. However, the upper end of the container will still project slightly above the horizontal flanges of these members. Thus, the upper end of the container will move the cap along members 67b until it moves off such members, at which time it will be beneath the sealing head unit 4. Members 67b serve to prevent the cap from sticking onto the upper end of the container prior to the sterilizing and sealing operations. These members are supported in a manner which will be described subsequently. Thus, a cap will be applied loosely to a container as it moves beneath the unit 3 and into position under the unit 4.

The sealing head unit 4 is illustrated best in Figures 1 to 5 inclusive. It comprises a flat plate 68 which is mounted beneath the plate 34 (Figure 5). This plate is adapted to be moved downwardly by a pair of steam cylinder and piston units 69. Each of the units 69 comprises a cylindrical housing 70 in which a piston 71 is disposed for vertical movement. The piston 71 has a rod 72 which extends downwardly through a sleeve-like member 73 disposed centrally within the housing 70 and forming a head for closing the lower end thereof. The lower end of the member 73 has a reduced portion 74 which fits within an opening formed in the plate 34. The piston rod 72 fits tightly within the member 73 and is provided with a plurality of vertically spaced annular grooves 75 which aid in preventing escape of steam. Downward movement of the piston 71 is accomplished by allowing steam to enter into the cylinder 70 through an opening 78 at the upper end of the cylinder and exhaust of steam through an opening 79 at the lower end of the cylinder. Upward movement of the piston is accomplished by allowing steam to enter the cylinder through the opening 79 and exhaust through the opening 78.

The lower end of each of the piston rods 72 has a reduced portion 84 which fits in an opening formed in the plate 68. A nut 85 is threaded on the reduced portion 84 holds the plate in position on the rod. When the plate 68 is in its uppermost position, as shown in Figure 5 it fits within a recess 86 formed in the lower surface of the plate 34. The plate 68 is provided with a centrally disposed upstanding boss 87 on its upper surface. On the lower surface of the plate beneath the boss 87 is a recess 88. This recess is adapted to receive a rib 89 formed on the upper surface of a small sealing plate 90. The plate 90 will be of a suitable size depending upon the size of the cap to be forced on the container. It may be removed and replaced with a plate of a different size. It is normally held in position tightly against the lower surface of the plate 68 by means of a bolt 91 which passes down through an opening in the boss 87 and which has its lower end threaded into a threaded opening formed in the rib 89. A horseshoe magnet 94 is clamped to the plate 68 adjacent boss 87 by means of a pair of clamps 95 which engage the legs thereof. The legs of the magnet 94 have their lower ends disposed in recesses 97 formed in the upper surface of the plate 68. Thus, only a thin section 98 of the material of the plate 68 is between each end of the magnet and the plate 90. The plate 90 is of magnetic material while the plate 68 and the clamps 95 are of non-magnetic material. Thus, the plate 90 will be magnetized by the magnet 94. It will be apparent that when the plate 68 moves vertically, the magnet 94 will move therewith.

In order to actuate the cap feeding and applying unit, I provide a cylinder and piston unit 99. This unit embodies a cylinder 100 (Figure 4) which has a bracket portion 101 that is bolted to the upper surface of the plate 34. The cylinder 100 has a piston 102 disposed therein which is connected to a piston rod 103. This rod passes loosely through an opening in one end of the cylinder and its outer end is mounted for reciprocation in a bearing member 104 which is secured to the member 44 of the cap feeding unit. The piston rod 103 is disposed tangentially relative to the ring 61 and passes through a transverse slot (Figure 8) in the upper end of a bracket member 105. This slot is adapted to permit limited movement of bracket 105 relative to rod 103. The rod is prevented from pulling through this slot by means of a cap 106 (Figure 8) secured to the outer end thereof. The bracket 105 has its lower end secured at 107 to the upper surface of the ring 61. The bracket passes upwardly through a slot 108 formed in the member 48. A compression spring 109 is disposed in surrounding relationship to the rod 103 between bearing member 104 and bracket 105. The spring 109 does not contact member 104 but engages a shoulder 104a (Figure 4) formed adjacent thereto on the piston rod. A compression spring 109a is disposed in surrounding relationship to the piston rod and has its outer end bearing against member 104 and its inner end bearing against the piston 102. The springs 109 and 109a serve to keep the piston in the position indicated in Figure 4. The closed end of the cylinder 100 is provided with an opening 100a through which steam may be supplied or exhausted to control movement of piston 102 and, consequently, operation of the cap feeding unit. The flow of steam into and out of the cylinder 100 is controlled in such a manner, as will be explained later, that the cap feeding device will be actuated to release a cap from the stack each time the sealing head is actuated.

In order to sterilize the caps and the upper portion of the containers, and in order to inject steam into the upper ends of the containers, I provide the following structure which is illustrated best in Figures 2, 3, and 5. Below the plate 68 I provide a pair of steam jet members 110. These members 110 are elongated and are disposed in spaced parallel relationship, as indicated in Figure 5, on opposite sides of the path of movement of the container. They are located at such a height that they are disposed substantially at the upper end of the container when it is being sealed. The members 110 are spaced downwardly from the plate 68 a distance sufficient to permit the required downward movement of the plate 68 in order to seal the cap on the container. Each of the members 110 is provided with a jet opening 111 on its inner edge which takes the form of an elongated slot, as illustrated best in Figure 2.

Each of the members 110 is carried on the upper side of a horizontally disposed arm 112 to which it is suitably secured, as by bolts 113. Each arm 112, at its one end, is provided with an upstanding portion 114 (Figure 3) which has a guide portion 115 formed on its upper end. This guide portion 115 cooperates with a guideway 116, formed by a recess in the lower portion of the plate 34 and guide members 117 suitably bolted to the lower surface of the plate 34. Thus, the arms 112 are mounted for sliding movement towards and away from each other.

To adjust these members towards and away from each other I provide a screw member 119. This screw member is provided with oppositely threaded sections which cooperate with threaded openings 120 formed in the portions 114 of members 112. This screw member is rotatably supported by the plate 34 and may be rotated by means of a knurled nut 121 (Figure 4). When the nut 121 is rotated, the arms 112 and, consequently, the members 110 will be moved towards or away from each other. Thus, the distance between the members 110 may be varied according to the size of the caps and the upper end of the containers.

In order to supply steam to each of the members 110, I provide a flexible conduit 122 connected to each end of the longitudinal passage 123 extending through the member 110 and which communicates with the jet opening 111. All four of these flexible conduits may be connected to any suitable source of steam. The source may be of the type disclosed in my said co-pending application S. N. 314,299.

A control valve 129 (Figure 1) is provided for controlling the supply of steam to the cylinder and piston units 69 and 99. This control valve is steam operated. It will be apparent from the drawings that the control valve 129 and the cylinder and piston units 69 are all disposed within a steam chest 69a. This is an important feature of my machine. The steam jacket serves to substantially prevent condensation of steam in the valve 129 and the units 69. Consequently, the steam is more effective. A steam conduit 128 is connected to the steam chest 69a and has its opposite end connected to a suitable source of supply of steam. The line 128 will supply steam to the chest 69a and keep it filled with steam under pressure.

The control valve 129 is illustrated best in Figures 3 to 7 inclusive. It comprises a cylindrical housing 130, which is vertically disposed within the steam chest 69a. The housing 130 has a vertically movable piston valve 131 disposed therein. This piston has extensions 131a (Figure 6) at its upper and lower ends which prevent the upper and lower ends from contacting throughout their areas the corresponding ends of the housing 130. The piston 131 has annular chambers 131b and 131c formed therein, adjacent the ends thereof, and an intermediate chamber 131d of annular form formed therein and being wider than the chambers 131b and 131c. A passageway 131e, formed centrally within the piston 131, connects the chamber 131b to the chamber 131c. A passageway 131f, which is very small in cross-section, connects the chamber 131d to the space above the upper end of the piston. A passageway 130a, formed in the wall of the housing 130, connects the chamber 131c to the space above the piston, when the piston is in the position indicated in Figure 6.

Figure 6:
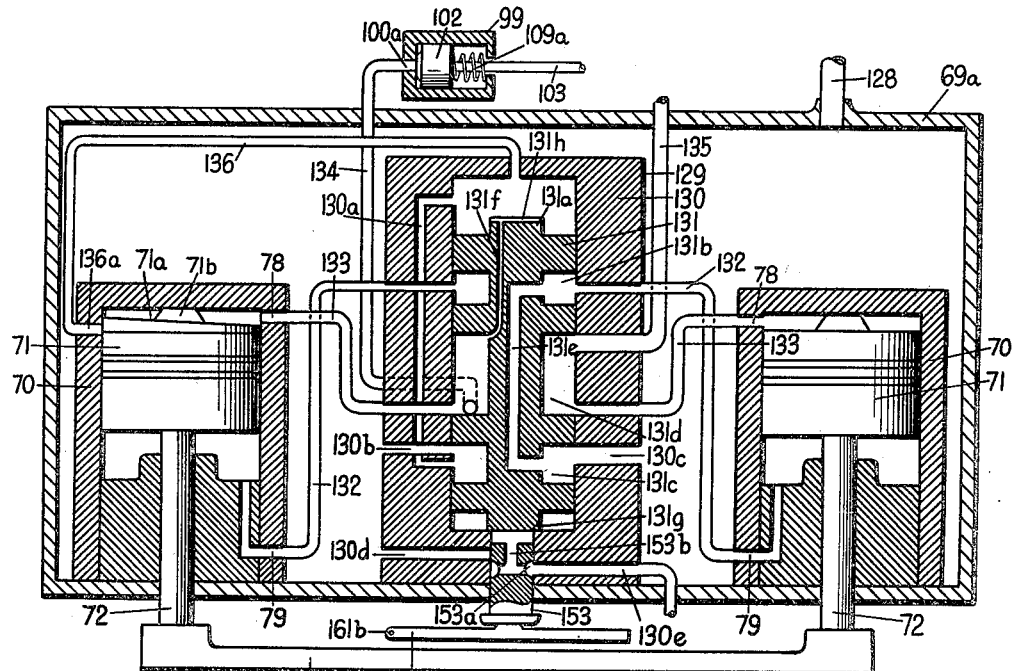
Figure 6 is a diagrammatic view of the fluid system for operating the sealing head, the pistons for operating the sealing head being in their uppermost position.

The piston valve 131 is illustrated in its normal position in Figure 6. When in this position, a line 132 connects the opening 79, in the lower end of each cylinder 70, to the annular chamber 131b in the piston 131. Also, a line 133 connects the opening 78, in the upper end of each cylinder 70, to the annular chamber 131d in the piston 131. Also, when the piston is in this position, a line 134 connects the chamber 131d to the opening 100a, leading into the unit 99 which controls the cap feed. Also, an exhaust line 135 leads from the chamber 131d, through the wall of the steam chest 69a to the atmosphere. Furthermore, a line 136 connects the upper end of housing 130 to an opening 136a, disposed adjacent the upper end of one of the cylinders 70. With the piston 131 in the position shown in Figure 6, this opening 136a is closed by the piston 71. It will be noted that this piston has an inclined upper surface 71a. By rotating the piston about its axis, the time at which the opening 136a will be covered and uncovered by the piston 71 may be varied. This will vary the time when the piston 131 will be moved downwardly relative to the downward movement of the sealing plate 90. However, the extension 71b on the upper end of each of the pistons 71 will always keep it from closing the opening 78. An inlet passageway 130b leads into the chamber 131c, at one side of the housing 130, while an inlet passageway 130c leads into the chamber 131c through the opposite side of the housing 130.

For controlling vertical movement of the piston valve 131, a small piston valve 153 is mounted in the lower end of housing 130 and extends through the wall of the steam chest 69a. This piston 153 is in axial alignment with piston 131 and is normally in the position indicated in Figure 6. It is provided with an annular groove 153a and a passageway 153b which is of inverted T-form. A steam inlet passageway 130d leads through the wall of housing 130 into the chamber in which member 153 is disposed. However, the inner end of passageway 130d is normally closed by member 153. An exhaust line 130e leads from the annular groove 153a, through the wall of the steam chest. Thus, steam will normally exhaust from the space below piston 131 in housing 130, through small inclined grooves 131g in the lower end of the lower extension 131a, through the passageway 153b, and through line 130e to the atmosphere.

When piston 153 is moved into the position indicated in Figure 6, the piston 131 is in the position indicated in this figure. With the piston 131 in the position indicated in Figure 6, the pistons 71 will be in their uppermost positions and, consequently, the sealing plate 90 will be in its uppermost position. Also, the unit 99 for controlling the cap feed will be inoperative. The pistons 71 will be held in this position, due to the fact that steam under pressure flows from the steam chest, through inlet 130c, through passageway 131e, through annular chamber 131b, through the lines 132, and finally through the openings 79 into the cylinders 70 below the pistons 71. Any steam in the upper end of the cylinders 70 will have exhausted through the openings 78, through lines 133, through annular chamber 131d and to the atmosphere, through the exhaust line 135. The piston 131 will be maintained in its lowermost position, due to the fact that steam will also flow from the steam chest through passageway 130b, passageway 130a, into the upper end of housing 130 above the piston 131. Any steam below the piston 131, will have exhausted through the passageway 153b and through the exhaust line 130e to the atmosphere. Steam will not flow from the upper end of the housing 130 through line 136 because the opening 136a will be closed by the piston 71. The unit 99 will be inoperative because the steam, at the closed end of the cylinder 100, will have exhausted through opening 100a, line 134, annular chamber 131d, and the exhaust line 135.

Figure 7:
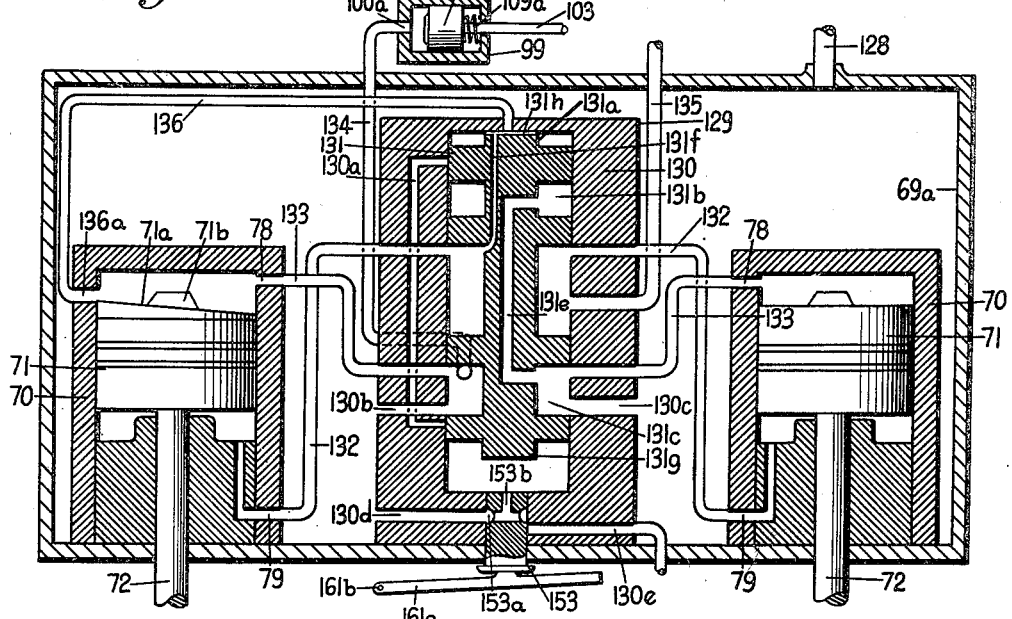
Figure 7 is a similar view but showing the pistons in their lowermost position.

When piston 153 is moved into the position indicated in Figure 7, the piston valve 131 will be raised to the position indicated in Figure 7. This will move the pistons 71 downwardly and, consequently, move the sealing plate 90 downwardly. Also, it will move the piston 102 of the unit 99 and actuate the cap feed. When piston 153 is moved upwardly, the exhaust passageway 130e is closed thereby and the inlet passageway 130d is opened thereby. Steam will flow through passageway 130d, through passageway 153b, into the housing 130 beneath the piston 131 and will move it upwardly. Movement of the piston 131 upwardly will cause the annular chamber 131b to communicate with the lines 132, permitting the steam to exhaust from the cylinders 70 below the pistons 71. At the same time the chamber 131c is brought into communication with the lines 133 and, consequently, steam is supplied to the cylinders 70 above the piston 71, forcing them downwardly. Any steam above the piston 131, during its upward movement, will be forced through the small passageway 131f, through passageway 131d, and through line 135 to the atmosphere. A transverse groove 131h is formed in the upper end of the upper extension 131a of the piston 131 and communicates with the upper end of passageway 131f. This permits exhaust of steam from the upper end of housing 130, even when the extension 131a contacts with the upper end of the housing. When the pistons 71 move downwardly, the opening 136a is exposed. Downward movement of pistons 71 causes downward movement of the sealing plate 90. When the piston 131 is moved upwardly, as shown in Figure 7, the annular chamber 131c is brought into communication with the line 134 which leads to the cylinder 100. Consequently, the piston 102 will be moved to operate the cap feed. Also, when piston 131 is moved to its uppermost position, the passageway 130a will be closed by the piston at both of its ends. Thus, it will be apparent that each time the piston 131 is moved upwardly, by means of upward movement of the piston 153, the sealing head will be actuated and the cap feed will be actuated.

The piston 153 is moved upwardly in a manner to be described. It is held in its uppermost position until the sealing operation is accomplished. Then it will drop down into the position indicated in Figure 6. When it returns to this position, the various parts of the steam system will be returned to the positions indicated in Figure 6 and the sealing plate 90 will be moved upwardly.

In order to move the piston 153 upwardly to cause actuation of the sealing head unit, I provide a trigger 157 (Figure 3) which will be actuated each time a container, with a cap thereon, is moved beneath the sealing head unit. The trigger will be actuated only when the container has a cap thereon and, consequently, there will be no danger of crushing the upper end of a container, if it is moved beneath the sealing head unit without a cap. The trigger is pivoted, as at 159, to the plate 68. The upper portion of the trigger operates in a vertical slot, formed in plate 34, while its lower portion operates in an aligning slot formed in the plates 68 and 90. When the plate 68 is in its uppermost position, the trigger 157 still extends a short distance below the plate 90, as indicated at 160 in Figure 3. When the container with a cap thereon is moved beneath the plate 90 by the conveyer, the cap, which is moved off members 67b, is lifted against the plate 90 by means of the magnet 94. However, the upper end of the container will still engage the skirt of the cap. The conveyer will tend to move the container along, which will also tend to slide the cap relative to the plate 90. This causes the cap to engage the lower end of the trigger 157, as shown in Figure 3, and swing it in the direction of the arrow about its pivot 159. This causes a horizontally extending arm 161, which is formed on the trigger, to engage the free end of a lever 161a and swing it upwardly. Since lever 161a is in contact with the lower end of the piston 153, the piston will be moved upwardly. This operates the cylinder and piston units 69 and 99 in the manner previously described. The lever 161a is pivoted at 161b to the plate 34 and is mounted for vertical movement in a slot formed therein.

As the plate 90 and the plate 68 are moved downwardly, the cap is forced onto the container and will ultimately be moved out of engagement with the lower end of the trigger 157. This will permit the trigger to swing back to its original position. As soon as piston 71 exposes the opening 136a, steam will be supplied through line 136 to the upper end of housing 130 and force the piston 131 to its lowermost position. This simultaneously forces piston 153 to its lowermost position, the steam from beneath piston 131 exhausting through passageways 153b and 130e. This returns all of the parts of the fluid system to the position indicated in Figure 6 ready to be actuated when a container with a cap thereon is moved to sealing position.

As previously indicated, the conveyer moves continuously. However, when the cap is being forced onto the container, it is necessary that movement of the container along with the conveyer be interrupted. This is accomplished with the following structure.

As shown in Figures 3 and 3a, at a point beneath the sealing head unit, the bottoms of the grooves through which the chains of the conveyer 2 pass are formed by longitudinally extending vertically movable members 166. These members are disposed in longitudinally extending slots formed in plate 9 of the conveyer unit. Each of the members 166 has a pin 167 depending therefrom and adjacent each end thereof. Each of these pins is threaded into the member 166, as at 168, and has a head 169 formed on its lower end. Each of the members 167 passes through an opening 170 formed in a support 171. Two of these supports 171 are attached to plate 9 and each is U-shaped. In surrounding relationship to each pin 167, is a compression spring 173. Each spring bears against the lower surface of the member 166 and against the member 171. These springs serve to keep the members 166 flush with the bottom of the chain-receiving grooves in plate 9 until the sealing operation takes place. When force is applied to the cap by the downwardly moving plate 68, in order to force the cap on the container, the chains 11 will be forced downwardly causing the members 166 also to be forced downwardly against the action of the springs 173. This will permit the lower end of the container to contact firmly with the portion 174 of plate 9 which is disposed between the two chains, as indicated in Figure 3a. The chains will continue to move beneath the container during the sealing operation. However, as soon as the sealing operation is completed, the members 166 will return to their original positions, lifting the chains again into engagement with the bottom of the container. The sealed container will then be moved along with the conveyer again.

From the preceding description, the operation of the entire machine will be well understood. The conveyer will be continuously driven, and the sealing head unit 4 and the cap feeding and applying unit 3 will be properly adjusted to accommodate the containers and caps to be used. The containers will be placed indiscriminately on the conveyer which will move them between the guides 33 so that they will be in proper alignment with the units 3 and 4. The containers will then be moved along, and as they pass beneath the unit 3, each container will withdraw a cap from the supports 67 and 67a, as previously described. The container with the cap loosely thereon will then be moved beneath the sealing head unit. When the container moves beneath the plate 90, the magnet serves to lift the cap slightly after it slides off members 67b. However, the upper end of the container will still engage the skirt of the cap and will move it along therewith. As soon as the cap contacts the trigger 157, the control valve will be actuated to apply steam to the cylinder and piston units 69 which will force the plate 68 downwardly. This will force the cap onto the container. At the same time, the unit 99 will be actuated so that it will feed another cap into position on the members 67 and 67a to be engaged by the next container. Thus, as the container moves into sealing position, it will automatically actuate the sealing head unit provided a cap is disposed on the upper end of the container. Before the cap is forced on the container, the cap is sterilized and the air in the upper end of the container is displaced by steam. This is accomplished by the steam jets 111. The steam is preferably at a low velocity so as not to entrain air.

In sealing the cap on the container, forcing of the rubber gasket over the upper end of the container in itself serves to hold the cap on the container. However, the condensation of the steam trapped in the head space in the container beneath the cap, which occurs immediately, produces a partial vacuum which is the main force serving to hold the cap on the jar and which also aids in preventing spoilage of the contents of the container. The sealing occurs substantially simultaneously with the injection of the steam into the container and, consequently, the steam will not have much chance of escaping from the container before it is sealed. During the sealing operation, movement of the container along with the conveyer is interrupted. However, immediately after the sealing operation occurs, the container will again be moved along with the continuously moving conveyer and will be moved away from sealing position. As previously stated, the container sealing mechanism will not function if a container which has no cap thereon passes therebeneath.

It will be apparent from the above description that I have provided a greatly simplified apparatus for applying and sealing closures on containers. The caps are first positioned on the containers loosely, are then lifted and the upper portion of the containers vacuumized and sterilized and simultaneously the caps are sterilized, and then caps are forced into engagement with the containers. The containers will be vacuumized and sealed quickly and effectively. The machine is very simple and can be built at a comparatively low cost. Due to the fact that steam is not only used for the sterilizing and vacuumizing operations but is also used as the power for operating the sealing head unit, simplification of the machine is facilitated. The machine can be adjusted readily to operate upon containers of various sizes and to use caps of various sizes.

Many other advantages will be apparent from the preceding description, the drawings and the following claims.

Having thus described my invention, what I claim is:

1. Apparatus for closing and sealing open-mouth containers comprising a conveyor for supporting the containers, a cap feeding and applying unit associated with the conveyor, a sealing unit associated with the conveyor, said sealing unit and said cap feeding and applying unit being steam-actuated, a valve for controlling the supply of steam to said units, said control valve being actuated by movement of a container, having a cap thereon, on the conveyor into position to be sealed by said sealing unit.

2. Apparatus for closing and sealing open-mouth containers comprising a conveyor for supporting the containers, a cap feeding and applying unit disposed above the conveyor, a sealing head unit disposed above the conveyor, said sealing head unit comprising a sealing head adapted to be moved downwardly relative to the conveyor, a steam cylinder for moving said head downwardly, a steam chest enclosing said cylinder, steam-actuated mechanism for operating said cap feeding and applying unit, a valve for controlling the supply of steam to said cylinder and to said steam-actuated mechanism, and a control member for actuating said valve, said control member being so disposed that it will be engaged by a cap on a container moved into position beneath the sealing head by said conveyor.

3. Apparatus for closing and sealing open-mouth containers comprising a continuously moving conveyor for supporting the containers, a sealing head unit disposed above the conveyor, a cap feeding and applying unit disposed above the conveyor, said sealing head unit comprising a sealing head adapted to be moved downwardly relative to the conveyor, a steam cylinder for moving said head downwardly, steam-actuated mechanism for operating said cap feeding and applying unit, a valve for controlling the supply of steam to said cylinder and to said steam-actuated mechanism, a control member for actuating said valve, said control member being so disposed that it will be engaged by a cap on a container moved into position beneath the sealing head by said conveyor, and means for interrupting movement of the container along with the conveyor during the sealing operation.

4. Apparatus for closing and sealing open-mouth containers comprising a conveyor for supporting the containers, a sealing head unit disposed above the conveyor, a cap feeding and applying unit disposed above the conveyor, said sealing head unit comprising a sealing head adapted to be moved downwardly relative to the conveyor, a fluid cylinder for moving said head downwardly, fluid-actuated mechanism for operating said cap feeding and applying unit, a valve for controlling the supply of fluid to said cylinder and to said fluid-actuated mechanism, and a control member for actuating said valve, said control member being so disposed that it will be engaged by a cap on a container moved into position beneath the sealing head by said conveyor.

5. Apparatus for closing and sealing open-mouth containers comprising a support for the container, a cap feeding and applying unit disposed above the support, a sealing head unit disposed above the support, said sealing head unit comprising a sealing head adapted to be moved downwardly relative to the support, a fluid cylinder for moving said head downwardly, a fluid cylinder for actuating said cap feeding and applying unit, a valve for controlling the supply of fluid to said cylinders, and a control member for actuating said valve, said control member being so disposed that it will be engaged by a cap on a container moved into position on said support beneath the sealing head.

6. Apparatus for closing and sealing open-mouth containers comprising a support for the container, a cap feeding and applying unit associated with the support, a sealing head unit associated with the support, fluid-actuated means for operating said sealing head unit, fluid-actuated means for operating said cap feeding and applying unit, a valve for controlling the supply of fluid to both of said means, and a control member for actuating said valve, said control member being so disposed that it will be engaged by a cap on a container in sealing position on said support.

7. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit comprising a sealing head adapted to be moved downwardly relative to the conveyer, a fluid cylinder for moving said head downwardly, a fluid cylinder for actuating said cap feeding and applying unit, a valve for controlling the supply of fluid to said cylinders, a control member for actuating said valve, said control member being so disposed that it will be engaged by a cap on a container moved into position beneath the sealing head by said conveyer, and means for interrupting movement of the container along with the conveyer during the sealing operation.

8. Apparatus for closing and sealing open-mouth containers comprising a conveyer for supporting the containers, a cap feeding and applying unit disposed above the conveyer for applying caps loosely to the mouths of the containers, a sealing head unit disposed above the conveyer, a fluid cylinder for actuating said sealing head unit, a fluid cylinder for actuating said cap feeding and applying unit, a control valve for controlling the supply of fluid to said cylinders and being connected to said cylinders, a control member for moving said valve, said control member being actuated by movement of a container on the conveyer into position beneath the sealing head unit.

9. Apparatus for closing and sealing open-mouth containers comprising a conveyer for supporting the containers, a cap feeding and applying unit disposed above the conveyer for applying caps loosely to the mouths of the containers, a sealing head unit disposed above the conveyer, said sealing head unit comprising a sealing head adapted to be moved downwardly relative to the conveyer, a steam cylinder for moving said head downwardly, a steam cylinder for actuating said cap feeding and applying unit, a valve connected to both of said cylinders for controlling the supply of steam to said cylinders, a control member for moving said valve, said control member being so disposed that it will be engaged by a cap on a container moved into position beneath the sealing head by said conveyer.

10. Apparatus for closing and sealing openmouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit comprising a sealing head adapted to be moved downwardly relative to the conveyor, a fluid cylinder for moving said head downwardly, a fluid cylinder for actuating said cap feeding and applying unit, a valve connected to both of said cylinders for controlling the supply of fluid to said cylinders, a control member for moving said valve, said control member being so disposed that it will be engaged by a cap on a container moved into position beneath the sealing head by said conveyor, and means for interrupting movement of the container along with the conveyor during the sealing operation.

11. Apparatus for closing and sealing openmouth containers comprising a conveyor for supporting the containers, a cap feeding and applying unit disposed above the conveyor for applying caps loosely to the mouths of the containers as they are moved beneath said unit, a sealing head unit disposed above the conveyer, fluid-actuated means for operating said sealing head unit, fluid-actuated means for operating said cap feeding and applying unit, and means for simultaneously operating both of said fluid-actuated means.

12. Apparatus for closing and sealing containers comprising a support for the container, a sealing unit associated with the support, a steam cylinder for actuating said sealing unit, a valve for controlling the supply of steam to said steam cylinder, and a heating jacket enclosing said cylinder and said valve.

13. Apparatus for closing and sealing containers comprising a support for the container, a sealing unit associated with the support, a steam cylinder for actuating said sealing unit, a valve for controlling the supply of steam to said steam cylinder, and a steam jacket enclosing said cylinder and said valve.

14. Apparatus for closing and sealing openmouth containers comprising a conveyer for supporting the containers, a sealing head unit disposed above the conveyer, a cap-feeding and applying unit disposed above the conveyer, said sealing head unit comprising a sealing head adapted to be moved downwardly relative to the conveyer, a fluid cylinder for moving said head downwardly, a fluid cylinder for operating said cap-feeding and applying unit, a valve for controlling the supply of fluid to both of said cylinders, and means for actuating said valve upon movement of a container, with a cap thereon, by the conveyer into position beneath the sealing head.

15. Apparatus for closing and sealing openmouth containers comprising a continuously moving conveyer for supporting the containers, a sealing head unit disposed above the conveyer, a cap-feeding and applying unit disposed above the conveyer, said unit including mechanism for feeding skirted caps into position to be engaged by the upper ends of the containers moved along by the conveyer, fluid-actuated mechanism for controlling the feeding of said caps, said sealing head unit comprising a sealing head adapted to be moved downwardly relative to the conveyer, fluid-actuated mechanism for moving said head downwardly, a valve for controlling the supply of fluid to both of said fluid-actuated mechanisms, and means for actuating said valve upon movement of a container, with a cap thereon, by the conveyer into position beneath the sealing head.

16. Apparatus for closing and sealing openmouth containers comprising a support for the container, a cap-feeding and applying unit disposed above the support, a sealing head unit disposed above the support, fluid-actuated means for operating said sealing head unit, fluid-actuated means for operating said cap-feeding and applying unit, and means for simultaneously operating both of said fluid-actuating means.

17. Apparatus for closing and sealing openmouth containers comprising a support for the containers, a sealing head unit disposed above the support, a steam cylinder for actuating said sealing head unit, a control valve for controlling the supply of steam to said cylinder, a steam jacket enclosing said cylinder and said control valve, means for supplying steam under pressure to said jacket, said valve being provided with an inlet communicating with said jacket.

18. Apparatus for closing and sealing openmouth containers comprising a conveyer for supporting the containers, a sealing head unit disposed above the conveyer, a cap-feeding and applying unit disposed above the conveyer, said sealing head unit comprising a sealing head adapted to be moved downwardly relative to the conveyer, a steam cylinder for moving said head downwardly, a steam cylinder for operating said cap-feeding and applying unit, a valve for controlling the supply of fluid to both of said cylinders, means for actuating said valve upon movement of a container with a cap thereon by the conveyer into position beneath the sealing head, and a steam jacket enclosing said cylinder for moving the sealing head and also enclosing said control valve.

WILLIAM D. BELL.